US008453570B2

(12) United States Patent
Boswell et al.

(10) Patent No.: US 8,453,570 B2
(45) Date of Patent: Jun. 4, 2013

(54) PRINTING

(75) Inventors: David Boswell, Woodley (GB); Mark Dicker, Sandown (GB); Steven Winton, Old Windsor (GB)

(73) Assignee: BASF SE, Ludwigshafen (DE)

(*) Notice: Subject to any disclaimer, the term of this patent is extended or adjusted under 35 U.S.C. 154(b) by 32 days.

(21) Appl. No.: 13/172,921

(22) Filed: Jun. 30, 2011

(65) Prior Publication Data

US 2012/0002255 A1   Jan. 5, 2012

Related U.S. Application Data

(62) Division of application No. 10/578,956, filed as application No. PCT/GB2004/004763 on Nov. 12, 2004, now Pat. No. 8,015,919.

(30) Foreign Application Priority Data

Nov. 14, 2003 (GB) .................................. 0326576.6

(51) Int. Cl.
*B41F 31/00* (2006.01)
(52) U.S. Cl.
USPC .......................................... 101/491; 101/488
(58) Field of Classification Search
USPC ........................................................ 101/491
See application file for complete search history.

(56) References Cited

U.S. PATENT DOCUMENTS

| 4,728,377 A | 3/1988 | Gallagher |
| 4,758,296 A | 7/1988 | McGrew |
| 4,856,857 A | 8/1989 | Takeuchi et al. |
| 4,913,504 A | 4/1990 | Gallagher |
| 4,913,858 A | 4/1990 | Miekka et al. |
| 4,933,120 A | 6/1990 | D'Amato et al. |
| 5,085,514 A | 2/1992 | Mallik et al. |
| 5,087,510 A | 2/1992 | Tokas et al. |
| 5,155,604 A | 10/1992 | Miekka et al. |
| 5,164,227 A | 11/1992 | Miekka et al. |
| 5,181,745 A | 1/1993 | Jacobsen et al. |
| 5,248,544 A | 9/1993 | Kaule |
| 5,492,370 A | 2/1996 | Chatwin et al. |
| 5,549,774 A | 8/1996 | Miekka et al. |
| 5,624,076 A | 4/1997 | Miekka et al. |
| 5,629,068 A | 5/1997 | Miekka et al. |
| 5,650,248 A | 7/1997 | Miekka et al. |
| 5,672,410 A | 9/1997 | Miekka et al. |
| 5,817,205 A | 10/1998 | Kaule |

(Continued)

FOREIGN PATENT DOCUMENTS

| CA | 2155850 A1 | 8/1994 |
| CN | 1276332 A | 12/2000 |

(Continued)

OTHER PUBLICATIONS

International Preliminary Report on Patentability received for PCT Patent Application No. PCT/GB2004/004763, mailed on May 15, 2006, 9 pages.

(Continued)

*Primary Examiner* — Anthony Nguyen
(74) *Attorney, Agent, or Firm* — Shruti Costales PLLC

(57) ABSTRACT

There is provided an apparatus and a method of printing a diffraction grating. In particular, the present invention relates to diffraction gratings applied to a substrate, such as a hologram.

8 Claims, 6 Drawing Sheets

U.S. PATENT DOCUMENTS

| | | | |
|---|---|---|---|
| 5,981,040 A | 11/1999 | Rich et al. | |
| 6,068,691 A | 5/2000 | Miekka et al. | |
| 6,245,412 B1 | 6/2001 | Choquette et al. | |
| 6,302,016 B1 | 10/2001 | Fausto et al. | |
| 6,331,326 B1 | 12/2001 | Tsunoda et al. | |
| 6,443,058 B1 | 9/2002 | Stadler et al. | |
| 6,656,306 B1 | 12/2003 | Mabbott | |
| 6,663,945 B2 | 12/2003 | Miyano | |
| 6,666,995 B1 * | 12/2003 | Meikka et al. | 264/1.31 |
| 6,691,610 B1 | 2/2004 | Wilen | |
| 6,749,930 B2 * | 6/2004 | Ohashi | 428/312.6 |
| 6,841,238 B2 * | 1/2005 | Argoitia et al. | 428/323 |
| 6,903,850 B2 | 6/2005 | Kay et al. | 359/2 |
| 6,932,451 B2 * | 8/2005 | Annacone | 347/2 |
| 7,128,272 B2 | 10/2006 | Doublet | |
| 7,191,945 B2 * | 3/2007 | Havard | 235/462.01 |
| 7,290,802 B1 | 11/2007 | Scarbrough et al. | |
| 7,463,154 B2 | 12/2008 | Cortina et al. | |
| 7,544,266 B2 | 6/2009 | Herring et al. | |
| 7,703,811 B2 * | 4/2010 | Isherwood | 283/82 |
| 7,751,608 B2 * | 7/2010 | Hersch et al. | 382/135 |
| 2002/0068224 A1 | 6/2002 | Danda et al. | |
| 2003/0104179 A1 | 6/2003 | Weder | |
| 2003/0124435 A1 | 7/2003 | Rich et al. | |
| 2006/0162853 A1 | 7/2006 | Elbers | |

FOREIGN PATENT DOCUMENTS

| | | |
|---|---|---|
| EP | 0253543 A1 | 1/1988 |
| EP | 0440045 A2 | 8/1991 |
| EP | 0609683 A1 | 8/1994 |
| GB | 2231572 A | 11/1990 |
| JP | 62-282078 A | 12/1987 |
| JP | 2001-040023 A | 2/2001 |
| JP | 2002-072887 A | 3/2002 |
| JP | 2003-285599 A | 10/2003 |
| WO | 92/16378 A1 | 10/1992 |
| WO | 95/17474 A1 | 6/1995 |
| WO | 02/04234 A1 | 1/2002 |
| WO | 02/094578 A1 | 11/2002 |
| WO | 03/031198 A1 | 4/2003 |
| WO | 03/103977 A1 | 12/2003 |
| WO | 2005/049745 A1 | 6/2005 |

OTHER PUBLICATIONS

International Search Report and Written Opinion received for PCT Patent Application No. PCT/GB2004/004763, mailed on Dec. 21, 2005, 14 pages.

* cited by examiner

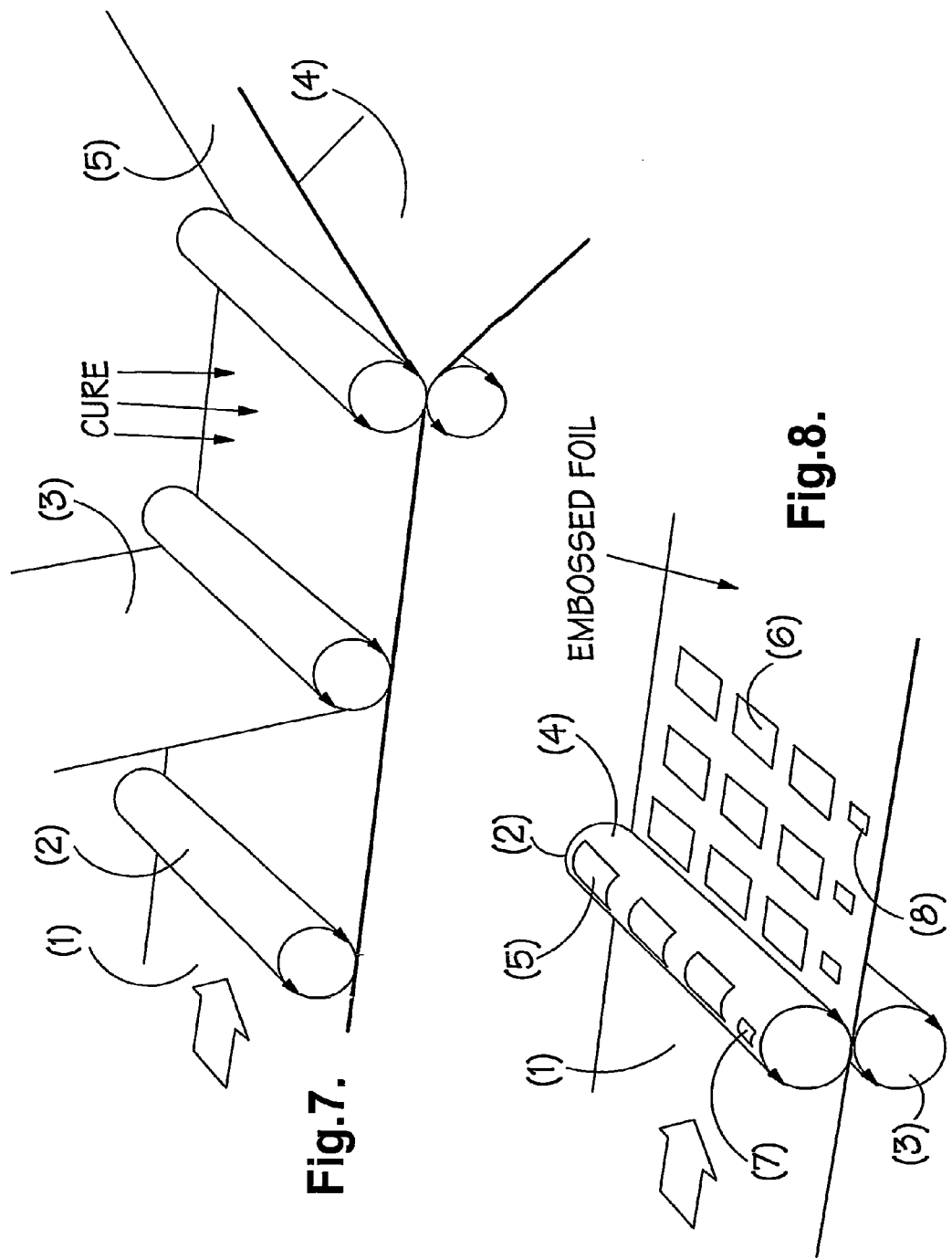

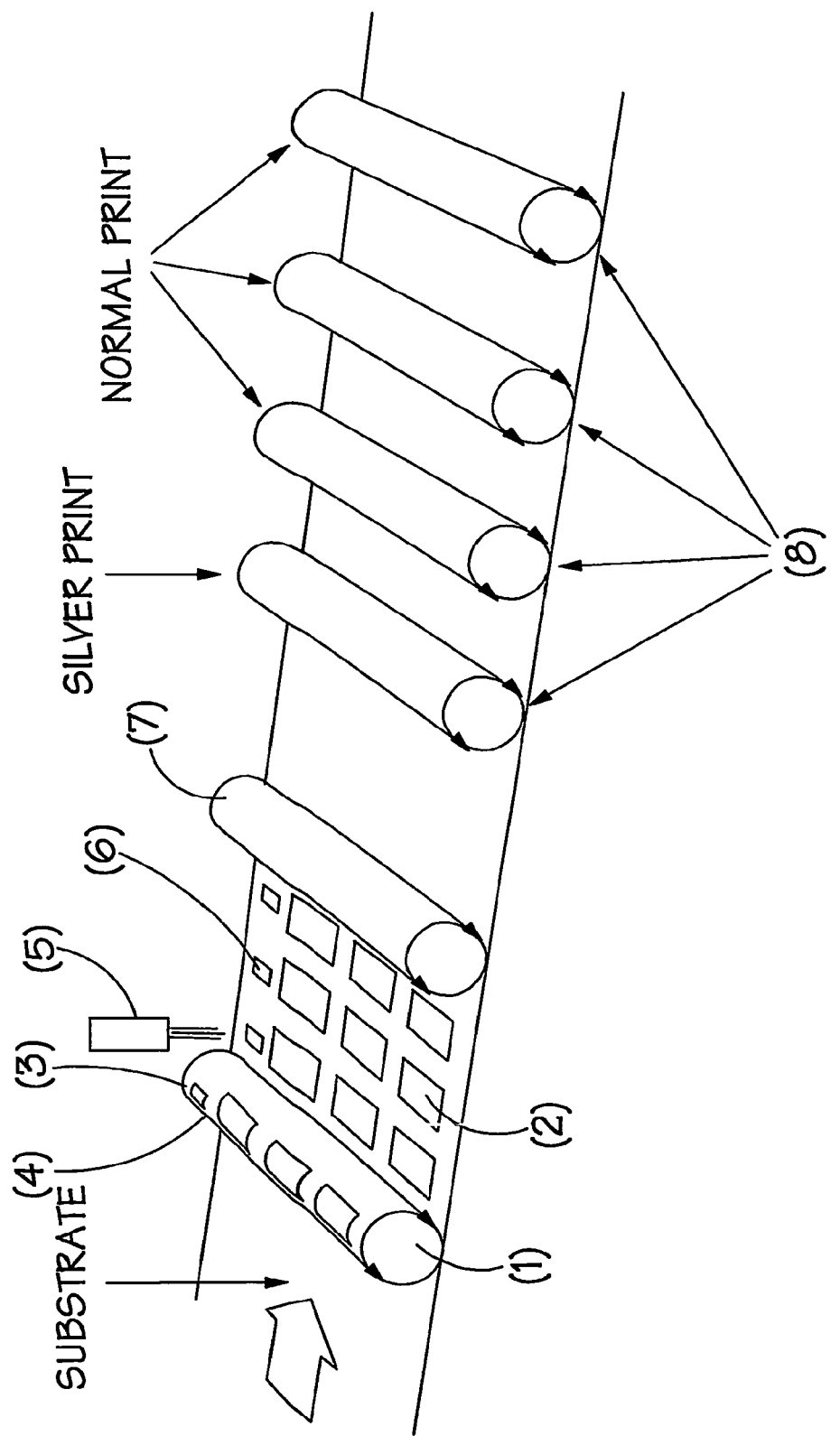

PRINTING

This application is a divisional application of U.S. patent application Ser. No. 10/578,956 filed on May 10, 2006 (which issued as U.S. Pat. No. 8,015,919 on Sep. 13, 2011), which is the National Stage of PCT/GB2004/004763 filed Nov. 12, 2004, which claims priority to UK 0326576.6 filed Nov. 14, 2003, wherein the contents of all applications are herein incorporated by reference.

The present invention relates to a method of printing, apparatus for printing and to products obtained therefrom. In particular, the present invention relates to diffraction gratings applied to a substrate, such as a hologram. More particularly, the present invention concerns sub-microscopic, holographic or other diffraction gratings.

The use diffraction grating patterns and images which include sub-microscopic, holographic and other forms of diffraction gratings, especially on documents, credit cards and packaging for security purposes, has become commonplace. Nevertheless, despite such popular use, the utilisation of patterns and images is expensive and involves the manufacture of a pattern or image in one operation and, in a second separate operation, the pattern or image is transferred adhered or laminated to the intended substrate, document or article, examples of which are; banknotes, cheques, gift vouchers, credit/debit cards, security brand protection and non-secure label systems and packaging items.

Three-dimensional light diffracting patterns such as a hologram are the result of interfering two beams of coherent light at a finite angle with each other on a photosensitive medium. One beam is a reference beam and the other interacts with the object whose image is to be recorded. The resulting hologram is made having the image information recorded as surface variations of the holographic medium. A more rigid transfer master plate is subsequently made to form replica holographic images.

There are many methods to originate sub-microscopic or holographic diffraction gratings based on photoresist coated float glass plates, exposed to coherent light which have been manually or computer correlated, in the form of a microscopic pattern of fringes. This is manufactured by copying an original sub-microscopic or holographic diffraction grating origination. A transfer plate holding the sub-microscopic structure is used to produce a metal master copy from nickel. Subsequent generations of plates or shims can then be grown, by electroforming.

U.S. Pat. No. 4,913,858, discloses one method of embossing holographic diffraction pattern images into a plastic film or to a plastic coating of a substrate. The substrate is supplied with a coating of thermosensitive material having thermoplastic properties, heated to soften the coating using a heated cylinder alone or in combination with infra-red heaters and subsequently embossed to form a diffraction grating. The coated surface is then metallised by depositing a coating of metal on the diffraction grating. The diffraction pattern obtained from such a method can be flawed owing to distortions in the grating due to excessive pressure applied to the embossing roller to form the grating or if the thermosensitive material is heated too much there will be some adherence of the coating to the embossing roller. Clearly for a holographic diffraction grating, any distortions to the grating will adversely affect the quality of the hologram image.

U.S. Pat. No. 4,728,377 discloses laminated sheet material having a support layer, a release coat covering the support layer, one or more layers of thermoplastic material overlying the release coat and less sensitive to heat than the release coat, and a layer of metal foil bonded to the surface of the thermoplastic layer. To form the diffraction grating, a die is impressed into the foil. The foil is then covered with an adhesive, the laminated sheet inverted and pressed against the item to which the diffraction grating is to be attached using a heated pressure plate whereby only the area of the sheet material under the pressure plate adheres to the item and separates from the support layer due to the melting of the release coat. When the support layer is lifted from the substrate, the foil and thermoplastic layers fracture along the edges of the pressure plate.

U.S. Pat. No. 5,087,510 discloses holograms having a relief-patterned metal surface electrolessly deposited on a relief-patterned polymeric substrate.

All of these documents describe forming a layer of metal, to provide a mirror-like luster, to improve the visibility of the image, into which a surface relief pattern is embossed using heated embossing members. If a discrete metallised pattern is desired, the overall surface is metallised followed by etching away unwanted metal using a suitable etchant such as an acid. Subsequently, in a separate operation the hologram is adhered or laminated to the intended document or article.

The methods described hereinabove require a significant amount of metal deposition to provide the luster effect, and, owing to the metal layer deposited, the image can only be viewed from the non-metallised surface of the substrate.

U.S. Pat. No. 5,549,774 discloses depositing metallic ink onto a transparent or translucent filmic sheet which has an embossed pattern, formed by pressing the sheet in contact with a heated nickel embossing shim at high pressure, on one surface and subsequently, in a separate operation, bonding a backing sheet having visual information to the embossed sheet.

As described above the application of high pressure and heat can adversely affect the integrity of the diffraction grating.

The separate operation of bonding a backing sheet, i.e. the substrate to which the hologram is to be applied, to the embossed filmic sheet reduces the speed of manufacture and can create further difficulties as the embossed filmic sheet and backing sheet must be carefully aligned so as to prevent incorrect positioning of the embossed material.

Furthermore, the application of high pressure and heat to emboss a filmic sheet, as described in U.S. Pat. No. 5,549,774, significantly reduces the speed of manufacture. Manufacturers have long sought to overcome the problems associated with the prior art with little or no success.

Advantageously, the present invention overcomes or alleviates one or more of the problems associated with the prior art.

In accordance with a first aspect of the present invention there is provided a method for forming a security product comprising the steps of:

a) providing a sheet of base material, said sheet having an upper and lower surface and being a component of the security product;

b) forming a diffraction grating on at least a portion of the upper surface of the base material; and c) depositing a metallic ink on at least a portion of the diffraction grating;

Advantageously, the present invention provides a method of manufacture to transfer and metallise a sub-microscopic or holographic diffraction grating directly onto the surface of a substrate and to do so with high productivity and low cost.

In accordance with a further aspect of the present invention, there is provided a method for forming a security product comprising the steps of:

a) providing a sheet of base material, said sheet having an upper and lower surface;
b) depositing a metallic ink on at least a portion of the diffraction grating; and
c) forming a diffraction grating on at least a portion of the metallic ink.

In accordance with a further aspect of the present invention, there is provided a method for forming a holographic diffraction grating on a substrate comprising the steps of:
a) applying a curable compound to at least a portion of the substrate;
b) contacting at least a portion of the curable compound with diffraction grating forming means;
c) curing the curable compound and
d) depositing a metallic ink on at least a portion of the cured compound.

In accordance with a further aspect of the present invention, there is provided an in-line method of printing on a substrate using a conventional printing press apparatus together with means for forming a diffraction grating, comprising the steps of:
a) forming a diffraction grating on a discrete portion of the substrate; and
b) depositing a metallic ink on at least a portion of the diffraction grating.

Furthermore, it would be advantageous to form the diffraction grating in register directly on the substrate to which the holographic image is to be applied.

In accordance with a further aspect of the present invention, there is provided an apparatus for forming a security product comprising a printing press and diffraction grating forming means.

The printing press may comprise any one or more of a
a) a feed system;
b) means to carry an image to be printed;
c) means to apply an ink to;
d) means to dry or cure the ink;
e) means to carry the printed security product.

The feed system may be a sheet or web feed system.

The means to carry an image may comprise a set of cylinders or a plate. In one embodiment, making use of GRAVURE printing, the means to carry an image comprises a plurality of cylinders, each of which carries an engraved image for each coloured ink used. Each cylinder or plate for depositing/applying a colour is termed a print unit. There can be any number of print units. Preferably, however, there are between 1 and 10.

The means to carry the printed security product may comprise a delivery system for stacking sheets or holding finished reels.

The above methods may all comprise subsequently printing of the base material or substrate with pigmented inks. Alternatively, the methods may all comprise the pre-step of printing the base material or substrate with pigmented inks.

In one embodiment, the base material or substrate is paper.

In accordance with a further aspect of the present invention, there is provided a method for forming a holographic diffraction grating on a substrate comprising the steps of:
a) depositing on at least a portion of the substrate a composition comprising a metallic ink admixed with a curable compound;
b) forming a diffraction grating on at least a portion of the composition.

In accordance with a further aspect of the present invention, there is provided a method for forming a holographic diffraction grating comprising the steps of:
a) providing a sheet of base material;
b) depositing a release coating to at least a portion of the base material;
c) depositing a curable compound on at least a portion of the coated base material;
d) forming a diffraction grating on at least a portion of the curable compound;
e) depositing a metallic ink on at least a portion of the diffraction grating; and
f) depositing an adhesive on at least a portion of the metallic ink.

The present invention provides methods of transferring a sub-microscopic image or holographic diffraction grating and by means of printing an ink, to form a composite sheet which when viewed from at least one surface of the substrate or base material reveals the formed sub-microscopic or holographic diffraction grating patterns or images.

The finished pattern or image may be fully printed with the metallic ink or have degrees of ink density which allows a partial metallisation effect of the image or pattern, whereby printing or text can be readily viewed through the image when applied to a filmic or paper substrate, for use on security products such as identification documents like passports, identification cards, drivers licenses, or other verification documents, pharmaceutical apparel, software, compact discs, tobacco and other products prone to counterfeiting or forgery, to protect them from fraudulent conversion, diversion i.e taking a product that should be sold in one market and selling it in another, or imitation.

The sub-microscopic images, holographic or other diffraction gratings may be transferred to the surface of the substrate specifically in registration or randomly for subsequent further registration of additional print units.

Once the image/pattern has been made visible by the overprinting of the metallic ink the image/pattern can not be again transferred to another surface other than by first depositing a release coat before forming the diffraction grating and hot stamped conventionally the substrate either filmic or paper based.

The metallic ink provides a reflective background to the substrate. Preferably sufficient ink is deposited in one pass on conventional narrow or wide web printing presses, to provide the reflective background. The printing press preferably comprises in line, an apparatus to transfer the sub-microscopic, holographic or other diffraction grating.

In-line is defined herein as printing in one pass, one operation immediately after the next one on the same piece of machinery that is bolted together. Off-line is defined as a totally separate process carried out on another piece of equipment.

In one embodiment the substrate is pre-printed. Pre-printing of the substrate may be carried-out separately, offline, on other dedicated printing equipment or in line on apparatus in accordance with the present invention.

An example of a metallic ink suitable for use in the methods and apparatus of the present invention is disclosed in co-pending application filed by Wolstenholme International Ltd.

Preferably, the thickness of the metallic ink when deposited on a substrate is sufficiently thin as to permit the transmission of light therethrough. Consequently, the metallic ink may be printed on the substrate over a sub-microscopic or holographic diffraction grating pattern or image, such that the diffraction grating pattern or image may be visible through both the upper and lower surface of the substrate.

Preferably, when the substrate carrying the metallised image or pattern is subsequently over-laid onto printed pictures and/or text, or the substrate is pre-printed with pictures and/or text and the metallised image or pattern is deposited thereon those printed features are visible through the substrate and/or the metallic ink coated diffraction grating or image.

Preferably, the thickness of the metallised image or diffraction grating is such as to provide an optical density in the range of light transmission. Optical densities of the layer of metallic ink can be measured by the Macbeth Densitometer set out in the following table:

| Macbeth Optical Density Units | Percent Transmission |
|---|---|
| 0.10 | 79.43 |
| 0.20 | 63.10 |
| 0.30 | 50.12 |
| 0.40 | 39.81 |
| 0.50 | 31.61 |

Preferably, the percentage of light transmission is at least 30%. More preferably, the percentage of light transmission is at least 50%, most preferably, 80%.

The apparatus may comprise means to continually move the substrate, for example a substrate feeder. The substrate may comprise any sheet material. The substrate may be substantially transparent, translucent, or opaque. The substrate may comprise paper, filmic material or metal, such as aluminium. The substrate may be in the form of one or more sheets or a web.

The substrate may be cast, calendared, blown, extruded and/or biaxially extruded.

The substrate may comprise polymeric compounds. The substrate may comprise any one or more selected from the group comprising polythyleneterephthalate, polypropylene propafilm, polyvinylchloride, rigid pvc, cellulose, tri-acetate, acetate polystyrene, polyethylene, nylon, acrylic and polytherimide board. The polythyleneterephthalate substrate may be Melenex type film orientated polypropylene (obtainable from DuPont Films Willimington Del. product ID Melinex HS-2)

The substrate may comprise papers made from wood pulp or cotton or synthetic wood free fibres. The paper may be coated, calendared or machine glazed.

The forming of a diffraction grating on the substrate may comprise depositing a curable compound on at least a portion of the substrate. The lacquer may be deposited by means of gravure or flexographic printing. The curable lacquer may be cured by ultraviolet (U.V.) light or an electron beam. Preferably, the lacquer is UV cured. UV curing lacquers can be obtained from Kingfisher Ink Limited, (product ultraviolet type UFV-203) or similar.

The U.V. light source may comprise a lamp. The lamp may have a power in the range of 200-450 Watts.

Preferably, the U.V. lamp is disposed on or in the means for forming a diffraction grating.

In one embodiment, the transfer speed of the sub-microscopic holographic diffraction grating image or pattern onto the surface of the printed lacquer will vary according to the power of the curing lamps. Preferably, the transfer speed is in the range of 10 meters to 20,000 meters per hour, more preferably 18,000 meters per hour. Whilst in contact with the lacquer the sub-microscopic or holographic diffraction grating is formed on the surface of the ultraviolet curable lacquer disposed on the upper surface of the substrate.

The metallic ink may be applied to the substrate by means of conventional printing press such as gravure, rotogravure, flexographic, lithographic, offset, letterpress intaglio and/or screen process, or other printing process. The substrate may then be rewound for subsequent off line printing at a later stage or alternatively, the substrate may be pre-printed in line or off line or subsequently printed in line.

The metal-based ink may comprise metal pigment particles and a binder.

The metal pigment particles may comprise any suitable metal. The particles may comprise any one or more selected from the group comprising aluminium, stainless steel, nichrome, gold, silver, platinum and copper. Preferably, the particles comprises metal flakes.

The metallic ink may be prepared by any means known to the skilled man. Preferably, a 12-micron thick transparent carrier film such as Polytheleneterephthalate obtained from DuPont Films Wilmington. Del. (Product ID Melinex HS-2) two meters wide is gravure coated with an acrylic resin isobutyl methacrylate obtained from DuPont (Product ID Elvacite 2045) and dried by means of hot air. In a second operation the acrylic-coated film is deposition coated with aluminium by means of a roll to roll vacuum chamber. The deposition rate and thickness of the vaporised aluminium layer over the printed acrylic coating is accurately controlled through continuous monitoring of the optical density during manufacture. The operating range of vacuum deposition may be in the range of 100 to 500 angstroms thick, the preferred thickness is in the range of 190 to 210 angstroms thick.

The optical density may in the range of 0.2 to 0.8 as measured on the McBeth densitometer. Preferably, the range is 0.5 to 0.8. More preferably, the optical density is 0.7 as measured on the McBeth densitometer.

The metal layer may comprise aluminium, stainless steel, nichrome, gold, silver, platinum or any other metal which can be vaporised and deposited by vacuum deposition or applied by sputtering or electron beam deposition. Preferably, the metal layer comprises aluminium.

The aluminium layer may be removed from the carrier film by means of desolving the acrylic supporting layer in a bath containing ethyl acetate releasing the aluminium layer from the carrier film. The resulting aluminium in the form of a coarse flake in the resin solution may then be washed in a multi stage centrifuging process to remove the acrylic resin. The coarse aluminium flakes are mixed with ethyl acetate and disintegrated by a high shear mixing process to produce a controlled particle size distribution. The average particle diameter may be in the range of 8 to 15 microns the preferred range being 9 to 10 microns diameter as measured by a Coulter LS130 l.a.s.e.r. diffraction granulometer.

In order that the sub-microscopic or holographic diffraction grating pattern or image is clearly visible on both the first and second surface of a clear filmic substrate and the first surface of a paper substrate, preferably, the aluminium or other flakes are printed in such a way as to align themselves with the contours of the sub-microscopic, holographic or other diffraction grating pattern or image surface wave length such that the flakes conform to and follow the contours of the diffraction grating.

To accomplish this alignment of flakes to the contours of the diffraction grating wave length i.e. the distance between peak and peak or trough and trough of the sub-microscopic contour. The specifically formulated metallic ink preferably has a very low binder content, high pigment to binder ratio and very thin aluminium flake, preferably in the range of 9 to 10 microns, consistent to maintain good adhesion of the ink to the surface to the sub-microscopic or holographic diffraction pattern or image.

The binder may comprise any one or more selected from the group comprising nitro cellulose, vinyl chloride, vinyl acetate copolymers, vinyl, acrylic, urethane, polyethyleneterephthalate, terpene phenol, polyolefin, silicone, cellulose, polyamide, rosin ester resins. The preferred binder is 50% nitrocellulose (ID nitrocellulose DHL120/170 and nitrocellulose DLX30/50 supplied by Nobel Industries) 50% polyurethane (ID Neorez U335 supplied by Avecia). The solvents may be ester/alcohol blends and preferably normal propyl acetate and ethanol in a ratio of 20:1 to 30:1.

The preferred pigment to binder ratio is by weight in the range of 1.5:1 to 3.0:1, preferably 2.5:1. The metal pigment content of the ink may be the range of 2% to 4% by weight, and preferably 3%.

The means for forming a diffraction grating may comprise a shim or a seamless roller. The shim or roller may he manufactured from any suitable material, such as nickel or polyester.

Preferably, the nickel shims are produced via a nickel sulphamate electro-plating process. The surface of a photoresist glass plate holding the sub-microscopic or holographic diffraction grating may be vacuum metallised or sprayed with pure silver. The plate may then be placed in a nickel sulphamate solution and over a period of time molecules of nickel are deposited on the surface of the silver-coated photoresist, resulting in a master copy. Subsequent copies may be used in transferring the image for reproduction, or transferring to ultraviolet polyester shims or to make a seamless roller.

Polyester shims may be made by coating polyester with an ultraviolet curable lacquer and contact copying the master image and curing the transferred image by means of ultraviolet light.

Seamless cylinders may be made using a metallised transfer film with a sub-microscopic or holographic diffraction grating pattern or image thereon, which may be fixed and transferred to a cylinder coated with an adhesive. The metallised transfer film may glued to the roller via a nip. The adhesive may then cured, preferably by heat. Once cured the transfer film is removed leaving the metallised layer with the sub-microscopic or holographic diffraction pattern or image on surface of the cylinder i.e. the roller. This is repeated until the cylinder is completely covered. This cylinder then may be placed in a casting tube and cast with silicone to make a mould. The sub-microscopic image may be moulded to the inside surface of the silicone in contact with image.

Once the silicone is cured the mould is removed and placed in a second casting tube. A casting roller may then be placed in the mould and cast with a hard resin, preferably cured with heat. Once cured the roller can be removed from the mould, where the image in the inside surface of the silicone has transferred to the outside surface of the resin cylinder and is ready for use, to transfer the sub-microscopic or holographic diffraction grating pattern or image on the surface of the cylinder into the surface of a printed ultraviolet curable lacquer on the first surface of a substrate, and subsequently printed with the metallic ink.

In another embodiment a cylinder is coated with ultraviolet curable resin, placing a clear transfer film with a sub-microscopic or holographic diffraction pattern or image to the surface of the ultraviolet resin via a nip and cured with ultraviolet light. The cylinder can then be subsequently cast, as described above and used to directly transfer the sub-microscopic or holographic diffraction pattern or image into the surface of a printed ultraviolet cured lacquer on the first surface of a substrate. Alternatively, the substrate may be subsequently printed with metallic ink off-line on conventional printing equipment.

The upper surface of the substrate may be printed with a metallic ink in discrete registered i.e. registered with other print already on the document etc., or in a position on the document etc., so that other subsequent printing can take place and/or non-registered areas as images/patterns, or in a stripe in discrete registered and/or non-registered or all over the substrate surface. The substrate may then pass through a nip roller to a cylinder carrying sub-microscopic, holographic or other diffraction grating pattern or image in the form of a nickel or polyester shim affixed to the surface of a cylinder. In a preferred embodiment the images or patterns are held on a seamless cylinder so that the accuracy of the transfer can be improved a cylinder with the sub-microscopic pattern or image on it means. The sub-microscopic diffraction or holographic grating may then be transferred from the shim or seamless roller into the surface of the exposed ultraviolet lacquer by means of bringing the surface of the shim or seamless roller into contact with the surface of the exposed ultraviolet lacquer. An ultraviolet light source may be exposed through the upper surface of the filmic substrate and instantly cures the lacquer by exposure to ultraviolet light. The ultraviolet light sources may be lamps in the range of 200 watts to 450 watts disposed inside the cylinder, curing through the printed ultraviolet lacquer and fixing the transferred sub-microscopic or holographic diffraction grating.

Specific embodiments of the present invention will now be described, by way of example only, with reference to the accompanying examples and figures, in which:

FIG. 7 is a perspective view of a schematic representation as shown in FIGS. 3, 4 and 6;

FIG. 8 is a perspective view of a schematic representation of a process for forming a sub-microscopic, holographic or other diffraction grating in a substrate in accordance with the present invention in register;

FIG. 10 is a perspective view of a schematic representation using for forming a diffraction grating on a non-embossable substrate in register;

EXAMPLE 1

Direct Ultra Violet Curable Holographic Print Over-Printed with Specially Formulated Metallic Ink (Film)

Figure 1:
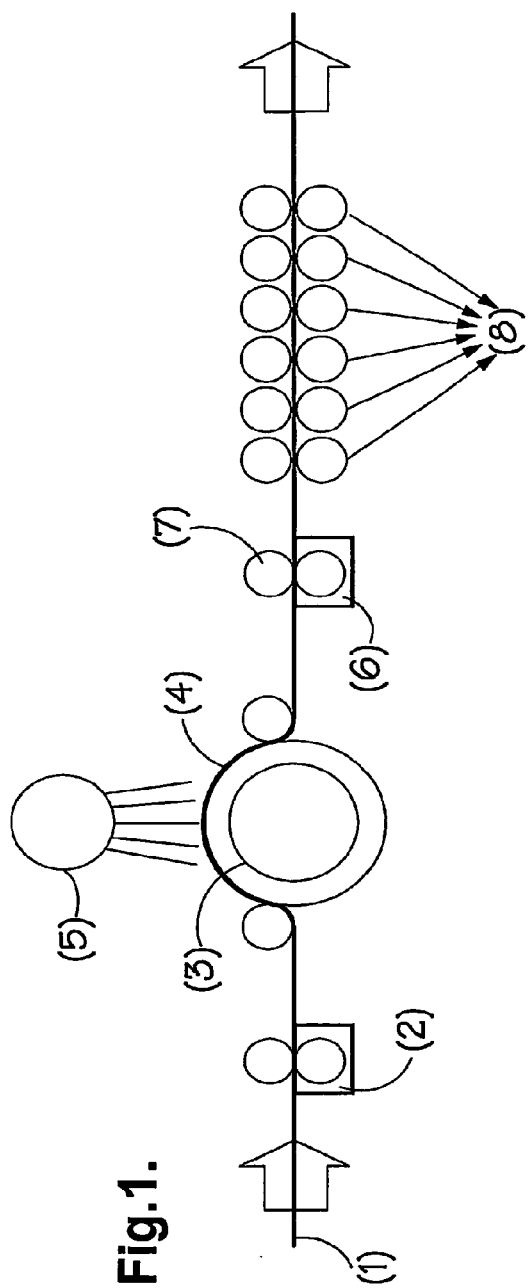
FIG. 1 is a schematic representation of a process for creating a sub-microscopic, holographic or other diffraction grating in accordance with the present invention using direct ultra violet curable lacquer over-printed with metallic ink.

Referring to FIG. 1., a filmic substrate such as OPP or PET, (1) is printed with an ultra violet curable lacquer (2) on its upper surface. A holographic diffraction grating is cast (3) into the surface of the lacquer (2) with a nickel shim (4) having the holographic grating thereon. The holographic image in the form of a diffraction grating is imparted into the lacquer and instantly cured (5) via a U.V. lamp disposed in shim (4) at normal processing speeds. The holographic image is a facsimile of the grating. Metallic ink (6) is printed (7) over the holographic grating and causes the holographic diffraction grating to become light reflective, the diffraction grating is visible on both sides of the filmic substrate. Further colours (8) can be subsequently conventionally printed in-line at normal printing process speeds.

In an alternative embodiment, the filmic substrate (1) is replaced with paper/board substrate. Such material is substantially opaque and therefore the holographic image is only visible when viewed from the upper surface.

EXAMPLE 2

Reverse of Example 1 Above (Film)

Figure 2:
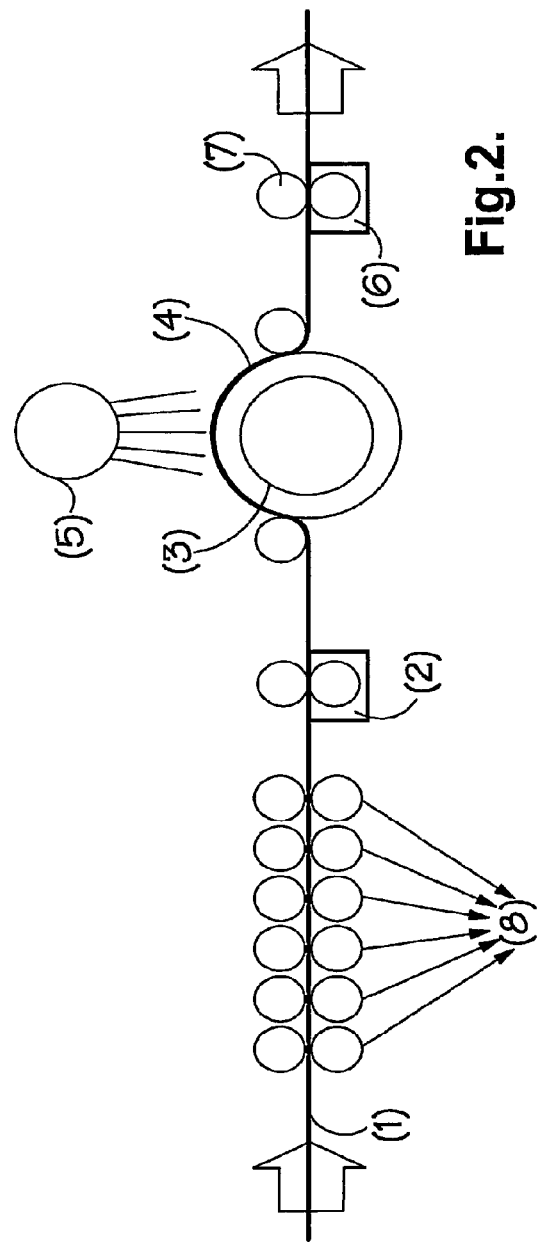
FIG. 2 is a schematic representation of the process of FIG. 1 reversed.

As shown in FIG. 2, Filmic substrate (1) is printed conventionally with a number of coloured inks. Using, for example, a Cerutti R950 printer (available from Cerrutti UK Long Hanborough Oxon.) (8), substrate (i) is then printed with an ultra violet curable lacquer (2) on the surface of a filmic substrate (1). A holographic diffraction grating is cast (3) into the surface of the lacquer (2) with a nickel shim (4) having the holographic grating thereon, the holographic image is imparted into the lacquer and instantly cured (5) via a UV lamp (not shown), becoming a facsimile of the grating disposed on the shim. A metallic ink (6) is printed (7) over the holographic grating and causes the holographic diffraction grating to become light reflective, the diffraction grating is visible on both sides of the filmic substrate.

In an alternative embodiment, the filmic substrate (1) is replaced with paper/board substrate. Such material is substantially opaque and therefore the image is only visible when viewed from the upper surface.

In another embodiment, the UV curable lacquer is replaced with an electronic beam curable lacquer and the UV lamp replaced with an electron beam emitting device.

EXAMPLE 3

Direct UV (Ultra Violet Curable Ink)

Figure 3:
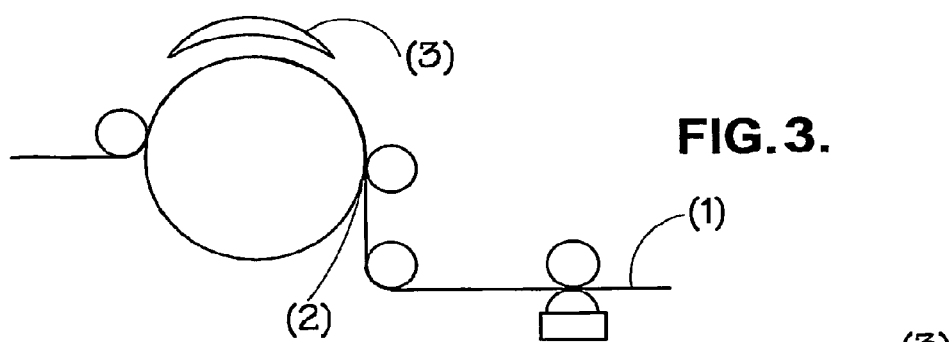
FIG. 3 is a schematic representation of a process for creating a sub-microscopic, holographic or other diffraction grating in accordance with the present invention using a ultra violet curable metallic ink.

Referring to FIG. 3, a UV curable variant of the metallic ink is printed on substrate (1) in and/or out of register using standard printing and coating equipment including Rotogravure/Flexographic methods into any compatible substrate surface. The embossing shim, dye or cylinder is brought into direct contact with the metallised ink (2). Whilst in a liquid state the ink is flash cured virtually instantaneously using a UV light source (3), through the substrate whilst the embossing shim, dye or cylinder remains in direct contact with the metallic ink using a UV type embossing machine. The surface tension of the substrate being greater than that of the embossing shim, dye or cylinder causes the ink to adhere to the substrate rather than the embossing shim, in a cured state, replicating and retaining the surface relief characteristics, integrity, holographic, diffractive or other sub-microscopic structure or micro-texture properties and effects within the metallised ink which is now incorporated onto the surface of the substrate.

EXAMPLE 4

Reverse of Example 3 Above

Figure 4:
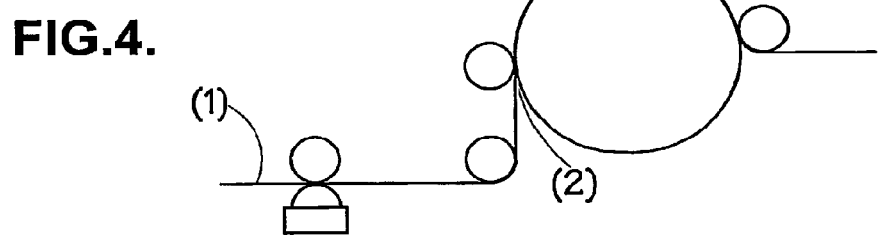
FIG. 4 is a schematic representation of the process of FIG. 3 reversed.

FIG. 4 shows the use of a UV curable variant of the metallic ink a UV type embossing engine is used. The ink is printed (1) in or out of register using standard printing and coating equipment including Rotogravure/Flexographic methods into any compatible substrate surface. The embossing shim, dye or cylinder is brought into direct contact with the metallised ink (2). Whilst in a liquid state the ink is flash (virtually instantaneously) cured using a UV light source (3), through the substrate whilst the embossing shim, dye or cylinder remains in direct contact with the metallic ink. The surface tension of the substrate being greater than that of the embossing shim, dye or cylinder causes the ink to adhere to the substrate rather than the embossing shim, in a cured state, replicating and retaining the surface relief characteristics, integrity, holographic, diffractive or other sub-microscopic structure or micro-texture properties and effects within the metallised ink which is now incorporated onto the surface of the substrate.

EXAMPLE 5

In-line Printing

Figure 5:
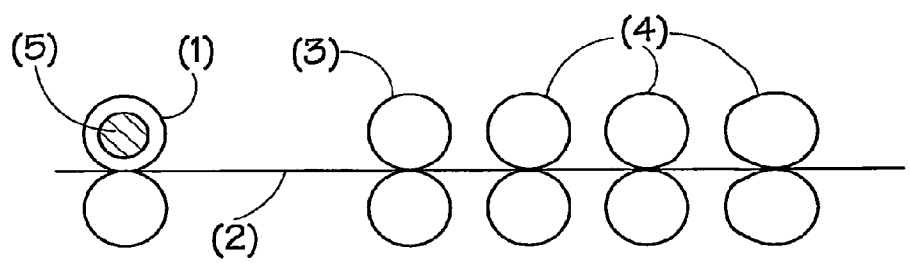
FIG. 5 is a schematic representation of a conventional printing process having an embossing station added in-line.

FIG. 5 shows that a conventional printing press Rotogravure, UV Flexographic or similar can have an extra station added, this being an embossing station (1) either Hard, when a pre-metallised material is embossed between a steel cylinder and tough but compliant roller. Soft when a material embossed with a steel cylinder and soft compliant roller then subsequently metallised UV or electron beam cured). Using any embossable film (2) either native/raw film/substrate such as Co-extruded BOPPs, Polyolefin's, Polyesters and Cellulose or pre-coated/lacquered. The substrate is first embossed (first station) (1) then printed (second station) (3) using a specifically formulated metallic ink to produce the metallised effect. Conventional printing (4) can also be carried out on the same press. As the ink is formulated like a normal ink, conventional printing methods can be utilised. The printing of the metallic ink can be anywhere in the line; it does not have to come directly after embossing. If an encoder for example an indexing machine which marks the sheet or web so that the mark can be recognised by the print operator (5) is placed in the embossing area and the embossing head has specified areas of imagery, then register to print can be achieved. Printing of the metallic ink can be solid, semi translucent etc, with the resulting effect being that in one pass of the printing press metallising, semi-metallising, de-metallising and normal printing of colours in or not in register can be achieved. The specifically formulated metallic ink can be printed on either side of the film, however generally this will be carried out on the embossed side, to encapsulate the holographic embossed image/pattern so that it remains intact, should it come into contact with any filling agents such as liquids, grease, solvents, lacquers, inks or any other surface contaminants or foreign bodies of any kind.

EXAMPLE 6

Dual In-line Printing

A conventional printing press Rotogravure, UV Flexographic etc. can have an extra station added, this being an embossing station, either Hard, Soft electron beam or UV. Utilising an existing or adding an additional print station (2), a holographic embossable substantially transparent coating can be printed coated laid down (This coating/lacquer generally being Nitro-Cellulose based, solvent evaporated), either on the whole surface of the substrate, partially or printed in register (for later re-registration by subsequent embossing and or print/coating stations). This area is then ready to be embossed and eliminates the need for pre-coated/lacquered films/substrates.

Figure 6:
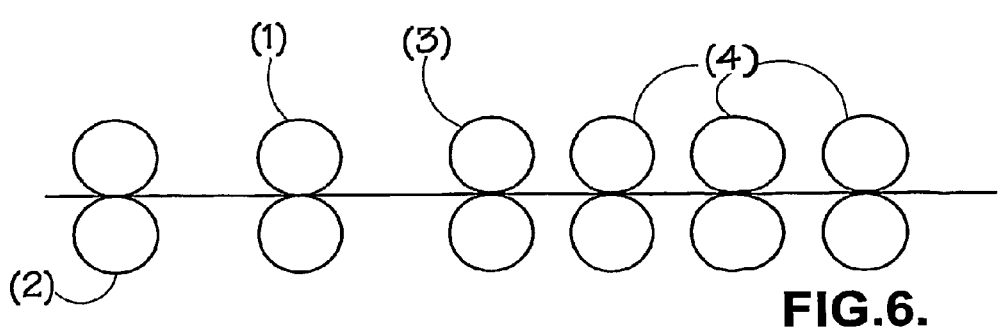
FIG. 6 is a schematic representation of a conventional printing process having an embossing station added in-line.

FIG. 6 shows a substrate first coated/lacquered (first station) (2) then embossed (second station) (1) and then using a third conventional (3) Rotogravure/Flexographic print station, to print the specially formulated metallised ink, producing the reflective silver metallised effect, is printed on the embossed side of the substrate/film. Then printing of other inks can be carried out as normal (4). The specially formulated metallised ink can be printed on either side of the film, however generally this will be carried out on the embossed side, to encapsulated the holographic embossed image/pattern so that it remains intact, should it come into contact with any filling agents such as liquids, grease, solvents, lacquers, inks or any other surface contaminants such as liquids, grease, solvents, lacquers, inks or any other surface contaminants or foreign bodies of any kind.

EXAMPLE 7

Transfer

FIG. 7 is a film that has a release coat, either applied/coated in-line or is part of the film's/substrate's design/construction intentionally or not is embossed (as in FIGS. 5/6/8), and then printed with the metallic ink, either in register of not (1), and then an adhesive (2) is applied again either all over or in register with the embossed image, then laminated to various substrates, (paper, Board, film) (3)/Once the adhesive is cured either in/on or off line the film can then be stripped (4) leaving the embossed and metallic area on the substrate (5), this transferred area can subsequently be over printed, providing either a compatible ink is used or a print receptive coating is applied to assist ink key, again this can be produced in, on or off-line.

EXAMPLE 8

Off-line (in Register) Printing

FIG. 8 is a schematic of a method to emboss a substrate using either a Hard, Soft electron beam or UV embosser. This is done by passing a substrate (1) through an embossing cylinder (2) and a nip roller (3), the embossing cylinder (2) has an embossing shim made of metal or plastic or directly on the cylinder (4) with a holographic/diffractive or engraved image (5) and with heat and pressure or UV curing emboss image (6) into various substrates. If a registration mark (7) is on the embossing cylinder this will also emboss on to the substrate (8). The substrate is then printed using specially formulated metallic ink on a conventional printing press. The specially formulated metallic ink can be printed down as a solid to give a full metallised effect or different coat weights to give different types of effects i.e., a semi metallised (HRI effect) etc. The substrate can be printed all over or because a registration mark (8) has been embossed on the substrate the specially formulated metallic ink can be printed in specified areas in register with the embossed image and normal printed images. If a transfer substrate is embossed then after printing of the formulated metal ink the substrate can be used for 'Transfer-metallising' on to paper, board, film and metal foils.

EXAMPLE 9

Emboss in Register

Registering a holographic/diffractive embossed area/image to print and or lacquered area or vice versa can be performed using two methods.

1. Utilising the Standard Native Embossable Films/Substrates.

The film can be either embossed in register and subsequently printed/over printed, or pre-printed and subsequently embossed in register to the printed areas in-line, on-line or off line, by means of registering and adjusting electronically the embossing cylinder to the subsequent printing cylinder or vice versa, or by means of a holographically, chemically, etched or engraved registration mark incorporated on the embossing shim/cylinder, this will then produce a white/grey registration mark when embossed into the film. For subsequent registration by electronically controlled photo cell either reflective or transmissive and printing in a specified area/areas, thus enabling the embossing station to be positioned anywhere in the machine system configuration, previous to the metallic ink printing that will be used as the reflective background to the holographic/diffractive embossed areas.

2. Utilising Lacquers/Coatings on Non-embossable Films/Substrates.

Figure 9:
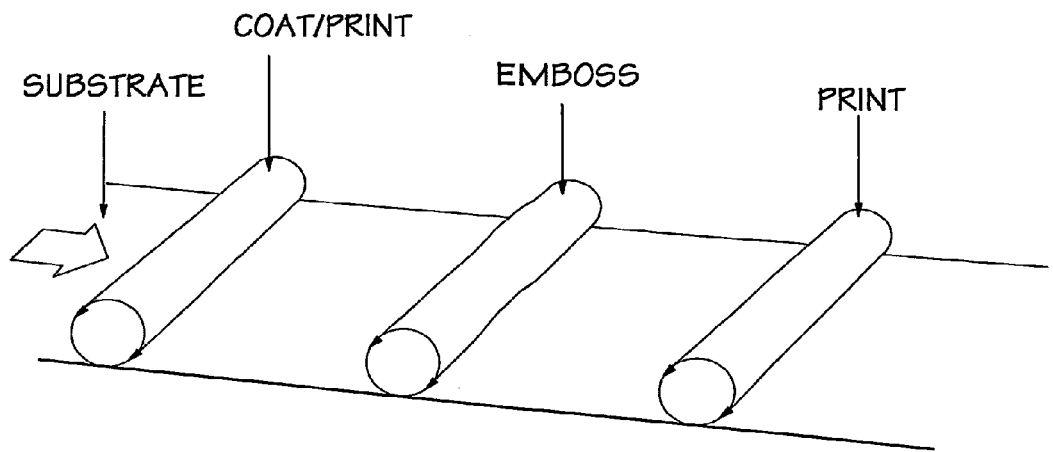
FIG. 9 is a perspective view of a schematic representation of a process for forming a sub-microscopic, holographic or other diffraction grating using a crating? an a non-embossable substrate.

I. To facilitate the use of a clear/transparent embossable coating/lacquer on normally un-embossable films/substrates for subsequent embossing and printing. A clear/transparent embossable coating/lacquer is printed over the entire surface of the film/substrate for subsequent embossing and/or printing. (see FIG. 9).

II. (FIG. 10) To allow the use of a clear/transparent embossable coating/lacquer on normally un-embossable films/substrates for subsequent embossing and printing. IN REGISTER. The use of an ink jet printer/encoder is incorporated on the print station (1) that will be used for the printing of an embossable coating/lacquer, once the embossable coating/lacquer area has been printed (2), the ink jet printer/encoder will register to a registration mark (3), notch, space etc. that is incorporated on the printing cylinder/sleeve/plate (4), once triggered by the electronic photo cell that detects the registration mark, the ink jet printer (5) is electronically/computer controlled to print a registration mark (6) on the film/substrate for later registration and embossing (7) into the embossable lacquer/coated areas (2), and for subsequent registration by further print stations (8) down line.

EXAMPLE 10

Off-line (Not in Register) Printing

Figure 11:
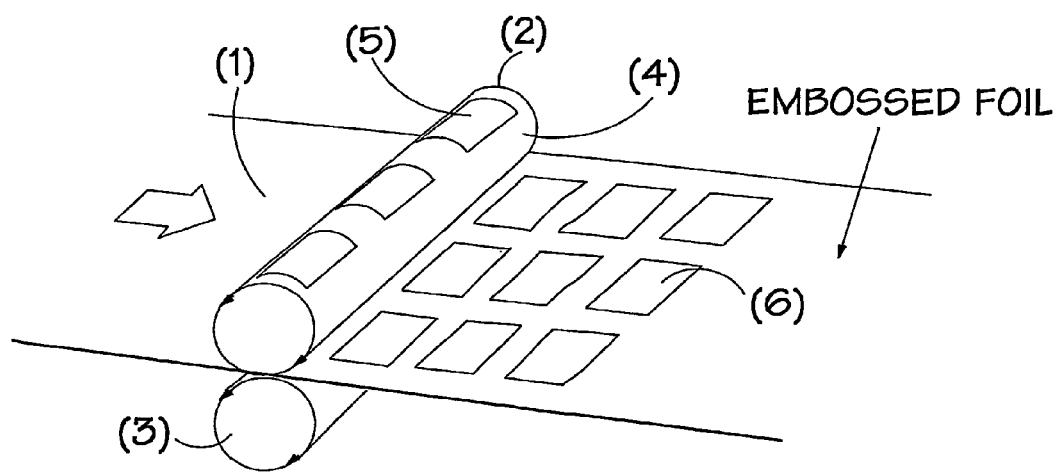
FIG. 11 is a perspective view of a schematic representation of a process for forming a diffraction grating not in register.

FIG. 11 shows a schematic of a method to emboss a substrate using either a Hard, Soft or UV embosser. This is done by Passing a substrate (1) through an embossing cylinder (2) and a nip roller (3), the embossing cylinder (2) has an embossing shim made of metal or plastic or directly on the cylinder (4) with a holographic/diffractive or engraved image (5) and with heat and pressure or UV curing emboss image (6) into various substrates. The substrate is then printed using specially formulated metallic ink on a conventional printing press. The ink can be printed down as a solid to give a full metallised effect or different coat weights to give different types of effects i.e., a semi metallised (HRI effect) etc. The substrate can be printed all over or because a registration mark (8) has been embossed on the substrate the specially formulated metallic ink can be printed in specified areas in register with the embossed image and normal printed images. If a transfer substrate is embossed then after printing of the formulated metal ink the substrate can be used for 'Transfermetallising' on to paper, board, film and metal foils.

Figure 12:
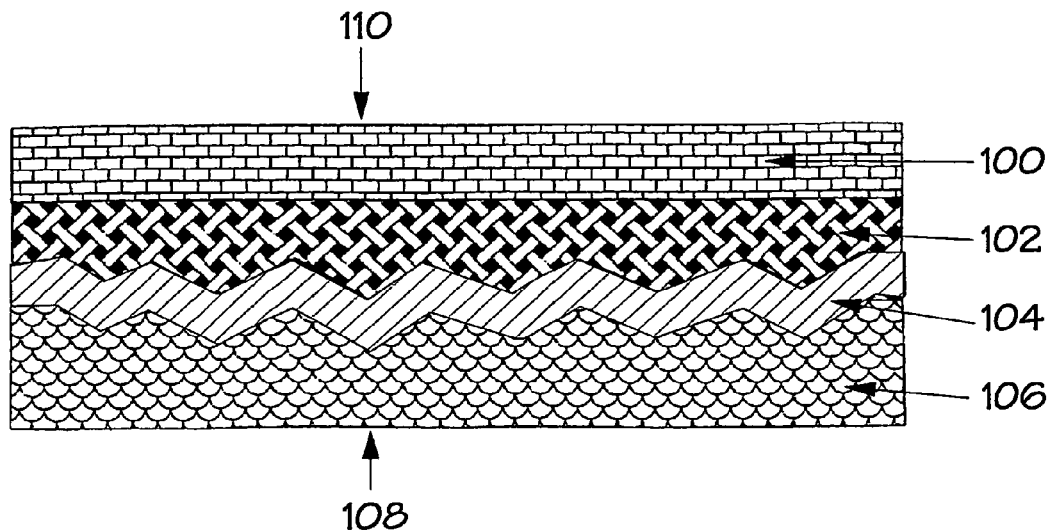
FIG. 12 is a cross-sectional schematic view of one embodiment in accordance with the present invention.

Referring to FIG. 12 a film substrate 100, UV curable lacquer 102 and holographic or other sub-microscopic diffraction grating 104 with metallic ink 106 printed over with both first 108 and second surfaces 110 viewable.

Figure 13:
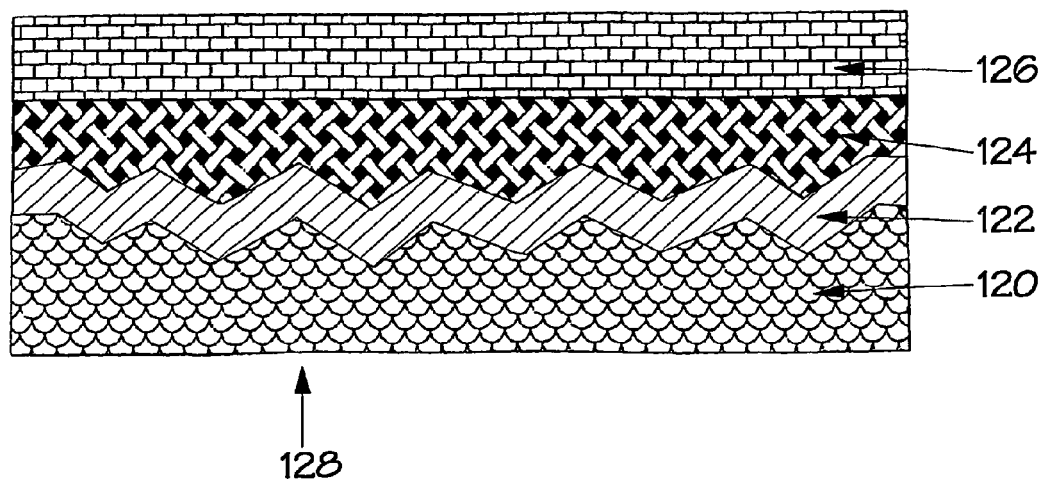
FIG. 13 is a cross-sectional schematic view of one embodiment in accordance with the present invention.

Referring to FIG. 13 a paper substrate 120, UV curable lacquer 122 and holographic or other sub-microscopic diffraction grating 124 with metallic ink 126 printed over with the image viewable through the first surface 128 only.

The invention claimed is:

1. An in-line method of printing on a substrate using a conventional printing press apparatus together with means for forming a diffraction grating, comprising the steps of:
   a) forming a diffraction grating on a discrete portion of the substrate; and
   b) depositing a metallic ink on at least a portion of the diffraction grating,
   wherein the metallic ink comprises metal pigment particles and a binder and wherein the thickness of pigment particles is in the range 100 to 500 angstroms.

2. The method of claim 1, wherein the step of forming of a diffraction grating on a substrate may comprise depositing a curable composition on at least a portion of the substrate.

3. The method of claim 1, wherein the curable composition is a lacquer.

4. The method of claim 3, wherein the curable lacquer is cured by means of an ultraviolet (U.V.) light or an electron beam.

5. The method of claim 2, wherein the diffraction grating is formed on the surface of the curable composition as it is disposed on the substrate.

6. The method of claim 1, wherein the thickness of the metallic ink when deposited on a substrate is sufficiently thin as to permit the transmission of light therethrough.

7. The method of claim 1, wherein the thickness of pigment particles is in the range of 190 to 210 angstroms.

8. The method of claim 1, wherein the thickness of pigment particles is in the range of 100 to 210 angstroms.

* * * * *